United States Patent [19]
Fauchez

[11] 3,964,023
[45] June 15, 1976

[54] METHOD OF AND APPARATUS FOR SELECTIVELY CONTROLLING A PLURALITY OF REMOTELY LOCATED LOADS

[75] Inventor: Jean-Jacques Fauchez, Saint-Egreve, France

[73] Assignee: Anvar, Agence Nationale de Valorisation de la Recherche, Neuilly-sur-Seine, France

[22] Filed: Feb. 19, 1975

[21] Appl. No.: 551,051

[30] Foreign Application Priority Data

Feb. 20, 1974 France .............................. 74.06553

[52] U.S. Cl. ...................... 340/147 PC; 340/310 A
[51] Int. Cl.² ........................................ H04Q 9/00
[58] Field of Search .......... 340/147 PC, 172, 167 R, 340/310 A, 310 R; 307/38, 40

[56] References Cited
UNITED STATES PATENTS

| | | | |
|---|---|---|---|
| 2,992,366 | 7/1961 | Veltfort | 340/147 PC |
| 3,310,777 | 3/1967 | Fosdick | 340/147 PC |

*Primary Examiner*—Harold Pitts
*Attorney, Agent, or Firm*—Karl F. Ross; Herbert Dubno

[57] ABSTRACT

A master controller is connected via a pair of wires to a plurality of loads and is capable of generating pulses having either positive or negative polarity and a voltage level either above a first threshold or below a second threshold or above the second threshold. Some of the slave units connected via these two wires to the master controller are singly handicapped and have a single zener diode whose avalanche voltage corresponds to the first threshold so that the load is energized whenever this first threshold is exceeded. Other units have a second zener diode in series of the first diode and itself having an avalanche voltage equal to the second threshold so that only when this second threshold is exceeded is the load energized. In such a system it is possible to provide a memory circuit to short circuit this second zener diode if it is desired to remove the double handicap and partially emancipate the slave unit. This memory circuit may comprise a thyristor connected across the second zener diode so that if the voltage in the input lines to the slave unit drop to zero the emancipation command from the memory is eliminated. In addition some of the slave units are connected via full-wave rectification bridges to the two conductors so that regardless of the polarity of the pulses they are energized, whereas others of the units do not have such full-wave rectification so that reversal of the signal polarity cuts these slave units out.

11 Claims, 7 Drawing Figures

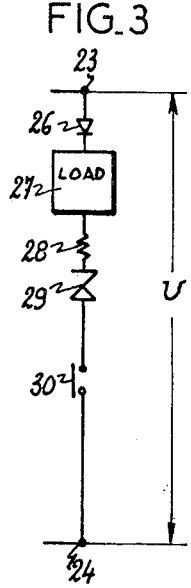
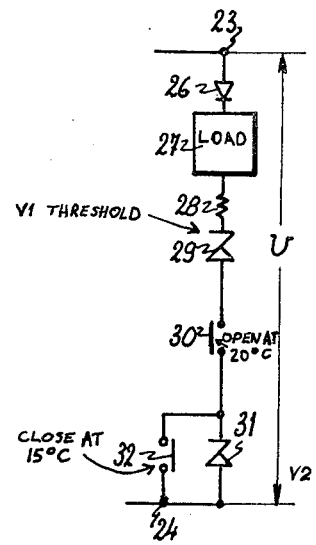
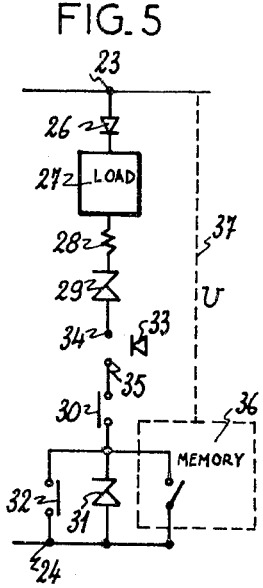
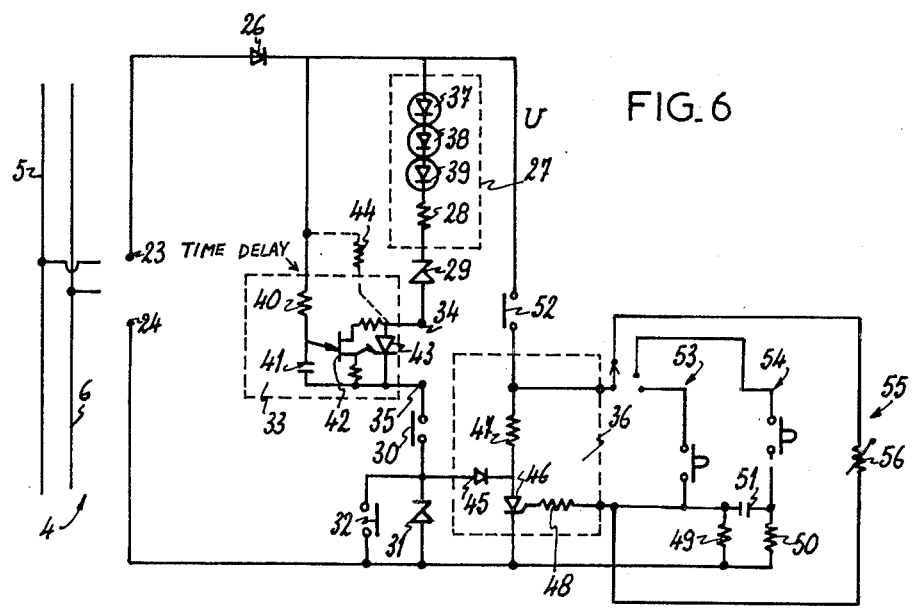

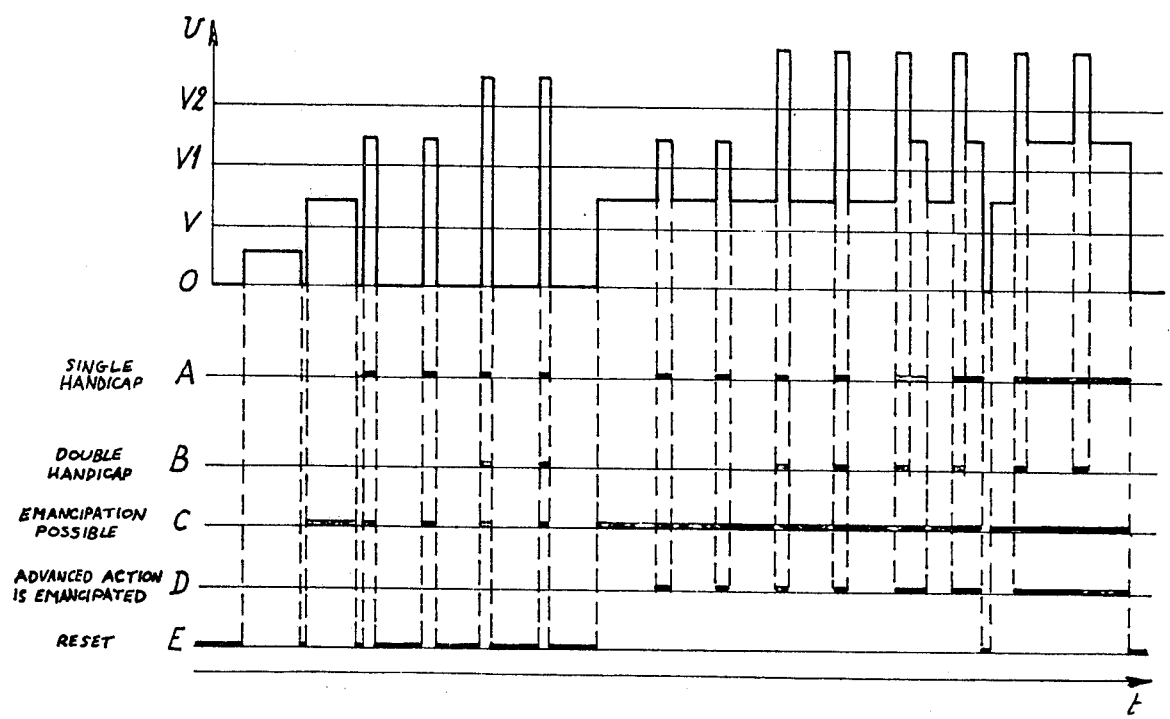

METHOD OF AND APPARATUS FOR SELECTIVELY CONTROLLING A PLURALITY OF REMOTELY LOCATED LOADS

FIELD OF THE INVENTION

The present invention relates to a method of and apparatus for controlling a plurality of variously remotely located loads from a single master location. More particularly this invention concerns an electronic system allowing a plurality of loads at respective locations remote from a single master control location to be operated from this master location either separately or jointly depending on the program in a master controller at the master location.

BACKGROUND OF THE INVENTION

It is frequently necessary to control from a central location a plurality of loads which are located at separate remote locations. An example of such a system would be a heating system of a building wherein the separate rooms and areas have their own individual thermostats and their own individual heating needs. In such an arrangement it is necessary to operate some of the loads during predetermined periods, other loads during other periods, and to provide a priority system whereby certain loads can be operated at any time. In such a heating system, for instance, certain areas are heated only during the day, and other areas are heated to a lower temperature at night than during the day.

Traditionally such control has been exercised by providing a central master controller which is connected to each slave unit operating a respective load via a respective conductor or pair of conductors. Thus in such a system it is necessary to provide a very large multiconductor cable that passes through the slave units and connects them all back to the master controller. In addition it is almost impossible to expand such a unit, as the addition of each new slave unit requires the wiring back to the master controller of a new conductor or pair of conductors.

This difficulty has been overcome in some systems by providing complicated coding arrangements at the master controller and complicated decoders at the slave units. Thus it is possible to pass a single conductor or pair of conductors from the master controller to all of the slave units. A pulse-coded signal is formed at the master controller and is decoded at each of the slave units so that only those units programmed to operate with a certain code will be operated at certain times. Such a system is relatively expensive and failure-prone, as pulses induced in the wiring by external forces can frequently cause operation of the wrong slave units or nonoperation of the slave units that are supposed to operate. Another difficulty with such systems is that an extremely complicated second decoding arrangement is necessary if an override provision is required at one of the slave units.

Another disadvantage of the prior-art systems is that each slave unit requires its own power supply. This power is frequently taken directly off the load, but in any case it is necessary that the separate slave units be connected to and provided with their own power supplies. The result is a considerable increase in the cost of each slave unit, especially in systems where the load is a 3-phase 220 volt heater, motor, or the like.

OBJECTS OF THE INVENTION

It is therefore the object of the present invention to provide an improved method of and apparatus for operating a plurality of variously remotely located loads from a single master location.

Another object is the provision of such a system wherein the necessity for a separate conductor or conductor pair from the master to each load and the necessity for a separate power supply at each load is obviated.

An additional object of this invention is to provide a control system of this type wherein power consumption is relatively low and at the same time operation is sure.

Another object is the provision of such a control system wherein the slave units are inexpensive and can readily and inexpensively be equipped with means for their emancipation, by which is meant partially or totally freeing the slave unit from control by the master controller.

Yet another object is to provide such a system wherein the slave units are not affected by transient pulses in the feed conductor.

SUMMARY OF THE INVENTION

These objects are attained according to the present invention in a system wherein the master controller includes means for generating a succession of voltage signals each of positive or negative polarity and of a voltage level either above a first threshold and below a second threshold or above both of said thresholds. One conductor extends from this master controller to and through each of the slave units and serves to feed this succession of signals to all units. Some of the units are provided with priority determination means which operates the respective loads only on reception over the conductor of a signal having one of the polarities. Some of the units are provided with a first handicap means for operating the respective load only on reception over the conductor of a signal having a voltage level above the first threshold, and some of the slave units are provided with second handicap means which operates the respective load only on reception of a signal having a voltage level of the second threshold.

In accordance with the present invention the master controller can produce signals or pulses of at least four different types: positive with a voltage level above the first threshold, positive with the voltage level above the second threshold, negative with a voltage level above the first threshold, and negative with a voltage level above the second threshold. A circuit provided only with one such second handicap means responds to signals whether positive or negative which are above the second threshold level to operate the respective loads. If a priority determination means is combined with a second handicap means only one of the four possible signals can serve to operate the respective load. By the same token if only a first handicap means is provided in the slave unit all four types of signals will serve to operate the respective load. Obviously combinations between these systems can be made so that virtually any one or more of the four types of signals can be used to operate a given slave unit.

According to yet another feature of this invention in slave units having a second handicap, emancipation means is provided to lower this handicap to the level of the first handicap. This can be effected by providing first and second handicap means in series in a common slave unit and providing switch means connected across the second handicap means and closable to cut this second handicap means out when emancipation of the respective slave unit is desired. The switch means in accordance with the present invention comprises a thyristor connected across the second handicap means and means for feeding a pulse from the feed line into the gate of the shunt thyristor. In such a circuit, even after firing the thyristor, when the voltage in the feed line falls to zero or at least below the holding value for the thyristor, this thyristor will again be rendered nonconductive so that the emancipation is canceled out.

According to yet another feature of the present invention the handicap means each comprise one zener diode. The first handicap means uses a zener diode whose avalanche voltage corresponds to the respective threshold level.

In accordance with yet another feature of this invention each slave unit includes a time-delay means which prevents operation of the respective load until the signal in the feed line has lasted a predetermined length of time. This arrangement comprises in accordance with this invention a thyristor in series with the load and having a gate connected via a firing and time-constant circuit to the feed line so that only when the time constant of the circuit has been exceeded will this thyristor be fired and conduct. Such an arrangement insulates the respective slave unit from operation by transient spikes induced in the feed line or otherwise picked up by the feed line.

The system according to the present invention thereby allows a plurality of remotely controlled loads to be operated by respective slave units which are connected to the master controller via a single conductor or pair of conductors. The master controller feeds voltage signals to these slave units which serve not only to operate the specific units, but also to supply the necessary power for the slave units. Thus these slave units need not have their own power supplies. The use of zener diodes and thyristors allows the slave units to be produced relatively inexpensively and reduces their current consumption so that a light-gauge feed conductor may be employed.

BRIEF DESCRIPTION OF THE DRAWING

The above and other objects, features, and advantages will become more readily apparent from the following, reference being made to the accompanying drawing in which:

FIGS. 3–5 show three types of slave units in accordance with this invention;

FIG. 6 is a detailed electronic schematic view of the slave unit of FIG. 5; and

FIG. 7 is a pulse diagram illustrating operation of the system of FIG. 1.

Figure 1:
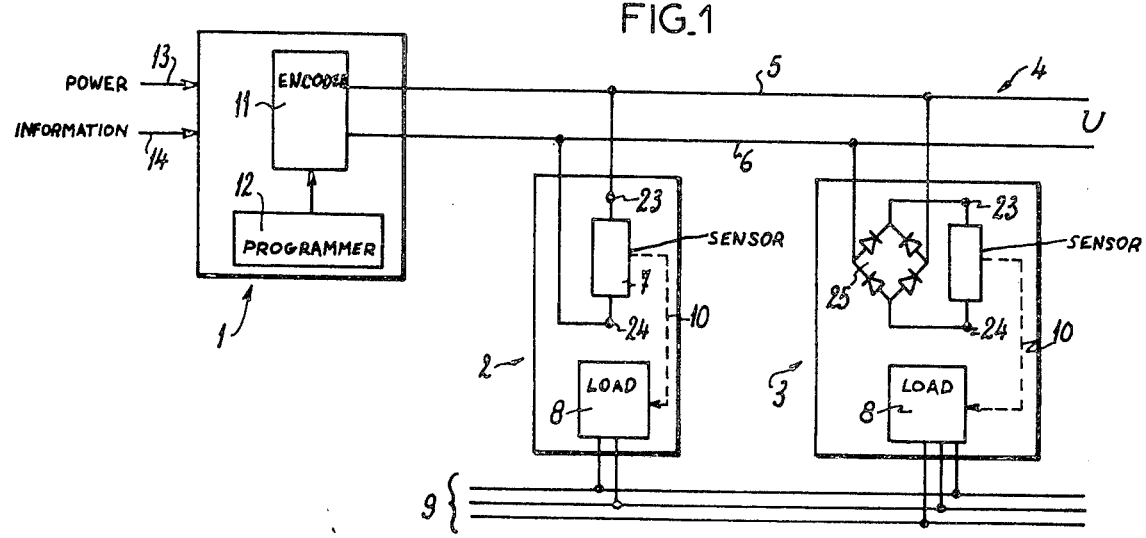
FIG. 1 is a schematic view illustrating a system according to the present invention.

The system according to the present invention as shown in FIG. 1 comprises a master controller 1 here shown to be connected to two slave units 2 and 3 by means of a cable 4 having two conductors 5 and 6. This master controller 1 emits signals on the lines 5 and 6 whose amplitude U changes between a level corresponding to zero voltage, or a level between or above any of three succeedingly higher voltage levels, V, V1, and V2. These slave units 2 and 3 each include a respective servocircuit 7 which is connected as indicated in FIG. 1 at 10 to a load 8 itself operating off high-power lines 9. According to the present invention the load 8 may be an electrical heater and the connection 10 may be optical.

Figure 2:
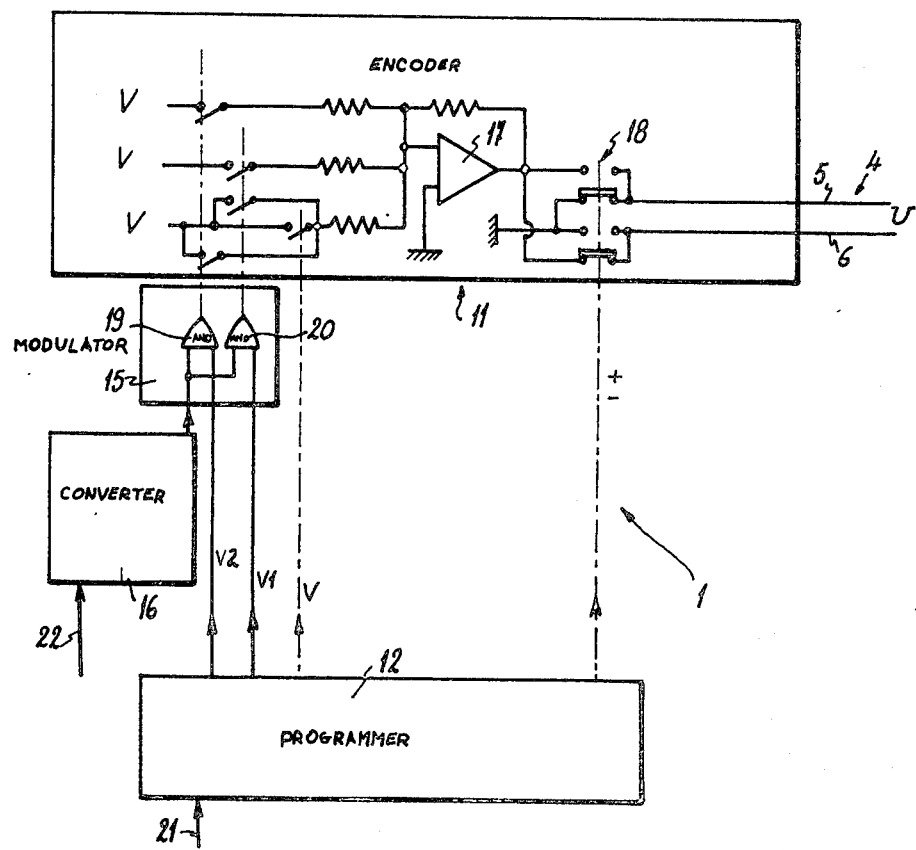
FIG. 2 is a schematic view showing the master controller of FIG. 1 in greater detail.

The master controller is basically formed of an encoder 11 and a programmer 12, receiving electric power as shown by arrow 13 and information as shown by arrow 14. The encoder 11, shown in greater detail in FIG. 2, comprises an operational power amplifier 17 connected as an analog voltage adder and operated by a modulator 15 having a pair of AND gates 19 and 20 controlled by an action/duration converter 16 and the programmer 12. Outside input for the programmer 12 is indicated schematically at 21 as is outside input 22 for the converter 16. The programmer 12 also operates on a double-pole double-throw switch 18 which serves to reverse the polarity of the conductors 5 and 6. The programmer 12 may be a simple clock mechanism functioning according to a particular pattern or may be considerably more complicated.

The receivers 7 have opposite sides 23 and 24 which may be connected directly across the lines 5 and 6 as shown for the slave 2, or connected via a full-wave bridge circuit 25 as shown for the unit 3 of FIG. 1. The polarity of the points 23 and 24 will always be the same in FIG. 3, regardless of the polarity of conductors 5 and 6, whereas this polarity will change for unit 2 as the polarity of conductors 5 and 6 changes.

The receivers shown in FIGS. 3, 4, and 5 are adapted to be connected between the points 23 and 24 and all comprise a diode 26, a load 27, a current-limiting resistor 28, a zener diode 29 which avalanches at voltage V1, and a normally closed switch 30, all in series. By way of example it is possible that the switch 30 comprises the normally closed contacts of a thermostat, with the switch opening when the temperature rises above 20°C. In addition, especially as shown in FIGS. 4 and 5, a second zener diode 31 shunted by a normally open switch 32 may be provided in series with the above-named elements. This diode 31 avalanches at a voltage V2 substantially higher than the voltage V1. The switch 32 by way of example may comprise the normally open contacts of the thermostat which closes at a temperature below 15°C. As shown in FIG. 5 it is further possible to have in this system a time-delay circuit 33 connected between points 34 and 35 in series in the circuit. In addition a memory 36 connected via a line 37 to the input side 23 of the receiver may be provided and itself constitute a switch capable of shorting the zener diode 31. This memory 36 will therefore serve as an emancipation circuit, as when it closes the zener diode 31 is effectively eliminated from the circuit and current will flow through the load 27 when the switch 30 is closed and the voltage V1 is exceeded.

The arrangement of FIG. 5 is shown in more detail in FIG. 6 where the load is shown to be formed of three photoemitting diodes 37, 38, and 39. It should be noted that when the load itself comprises a diode it is possible for the diode 26 to be dispensed with. The time-delay circuit 33 here comprises a resistor 40 and capacitor 41 forming a tuned circuit connected to the base of the unijunction transistor 42 biased through a resistor 44 and connected to the gate of a thyristor 43, here a silicon-controlled rectifier connected between the points 34 and 35. Thus, when the point 23 is energized with a voltage of a polarity to pass through the diode 26, the thyristor 43 will be fired by the transistor 42 after a predetermined length of time determined by the tuned circuit 40-41.

The memory 36 in this circuit is formed basically by a thyristor, once again a silicon-controlled rectifier 46 connected via a diode 45 across the zener 31 and having a gate connectable via a resistor 48 to a normally closed switch 52 whose other side is connected to the input line 23. A switch 53 or 54 will provide a sufficiently long pulse to fire the thyristor 46. It is also possible to provide a circuit 55 including a potientiometer 56 such that the voltage applied to the gate of the thyristor 46 depends directly on the voltage in line 23. It is also possible to replace the memory 36 with a clock device, a presence sensor, light sensor, a fixed-cycle multivibrator, or the like.

The device described above may be used advantageously to control a plurality of electric heaters throughout a building and functions as described below, with reference to FIG. 7:

Rooms which require constant heating to 20°C, such as nurseries and the like, are provided with a slave unit having the sensor shown in FIG. 3, with bridge circuit 25 as shown in FIG. 1, so that the load 27 will be energized at any time when the voltage in lines 5 and 6 exceeds V1 with either polarity. Other areas such as classrooms and bathrooms which must be kept well heated, but which only need heating at certain times can be provided with sensors as shown in FIG. 3, but without the full-wave rectification so that reversal of the polarity of the signals will cut these units out. The sensors shown in FIG. 4 can be used in corridors and areas which need be heated to 20°C during the day, but only to 15°C at night. The arrangement of FIG. 5 is used for living areas which are normally kept relatively warm during the day and relatively cool during the night, but where it may be desirable to raise the night-time temperature in case the room is still in use.

Thus as shown in FIG. 7 the voltage is varied as is shown on the upper part of the graph, forming signals or pulses having an amplitude U of between 0 volts and a voltage exceeding V2, so that those devices have a single handicap as shown in FIG. 3 will function as indicated in line A. Line B illustrates the functioning of those devices with a double handicap, such as devices from FIGS. 4 and 5. Line C indicates when emancipation of the second handicap is possible and line D indicates the type of action if the circuit is indeed emancipated. Line E indicates when the circuits will be reset.

Thus as shown in FIG. 6 assuming that the voltage between lines 5 and 6 exceeds V2 during daytime hours after the time delay determined by circuit 40, 41 the zener diodes 29 and 31 both conduct, providing the temperature in the room is below 20°C so that the switch 30 is closed and above 15°C so that the switch 32 is open. During the night hours the voltage level is, however, dropped to level V1. As this voltage is insufficient to fire the zener diode 31 the circuit can only conduct when the temperature drops below 15°C when the switch 32 closes and cuts out this second handicap zener diode 31, leaving only the first handicap diode 29 in the circuit. Thus the area will only be heated to 15°C. Should however someone in this room desire to keep the temperature at the higher daytime level he need merely operate the switch 53 so as to feed a pulse into the gate of thyristor 46 which will then be fired and shunt out the zener diode 31. This will remove the second handicap from the slave unit and allow it to function as the single handicap level (line A).

If the user now desires to cut out this extra heating he need merely actuate the push button switch 52 and thereby cut off the feed of voltage to the anode of thyristor 46. Conduction through thyristor 46 is immediately halted and the second-handicap diode 31 becomes effective again. This same action occurs automatically when the voltage in line 23 is less than a voltage V as indicated at line E in FIG. 7.

Clearly the use of a full-wave bridge 25 as shown in FIG. 1 makes the respective slave unit effective regardless of the polarity of the wires 5 and 6. Slave units so equipped are referred to as priority units. Other nonpriority units have a simple series diode 26 and can be completely shut off simply by reversing the polarity across lines 5 and 6.

It should be noted that when the voltage is above voltage V and below voltage V1 the time-delay circuit is operated, with concomitant conduction across the thyristor 43 and memory 36 may remain effective. Thus the master operates by an outside thermostat and if it is desired to cut off heating temporarily without canceling out the command in the memory the voltage is dropped to this level, between V and V1, and only raised occasionally to maintain the desired heating.

I claim:
1. A system for operating a plurality of variously remotely located loads from a single master location, said system comprising:
   a master controller at said master location including means for generating a succession of voltage signals each of positive or negative polarity and of a voltage level either above or below a predetermined threshold;
   at least four slave units connected in parallel to said master controller and each at and connected to a respective load;
   means including a conductor extending between said master controller and all of said slave units for feeding said signals to all of said units;
   priority means in one of said slave units for operating the respective load on reception over said conductor of a signal having either of said polarities;
   handicap means in another of said slave units for operating the respective load only on reception over said conductor of a signal of at least one of said polarities and having a voltage level above said threshold;
   negative-responsive means in yet another of said slave units for operating the respective load only on receptin over said conductor of a signal of negative polarity; and
   positive-responsive means in yet another of said slave units for operating the respective load only on reception over said conductor of a signal of positive polarity.

2. The system defined in claim 1 wherein said priority determination means includes a bridge circuit connected to said conductor.

3. The system defined in claim 1 wherein said handicap means includes a zener diode.

4. The system defined in claim 1, further comprising switch means connected to said handicap means for changing the handicap thereof and operating the respective load on reception over said conductor of a signal having a voltage level below said threshold.

5. The system defined in claim 4 wherein said handicap means includes a zener diode, said switch means including a normally open switch connected across said zener diode.

6. The system defined in claim 5 wherein said switch means includes a thyristor connected across said zener diode and means for feeding a voltage pulse from said conductor into the gate of said thyristor, whereby after firing of said thyristor by said pulse a drop to zero potential in said conductor opens said switch means.

7. The system defined in claim 1, further comprising time-delay means in some of said units for preventing operation of the respective load until the operating signal therefor has lasted a predetermined length of time.

8. The system defined in claim 7 wherein said time-delay means includes a thyristor connected in series with the respective load and means including a time-constant circuit connected between the gate of said thyristor and said conductor for feeding a voltage pulse to said gate from said conductor after a signal on said conductor has lasted said predetermined length of time.

9. A method of operating a plurality of variously remotely located loads from a single master location, said method comprising the steps of:

feeding to all of a plurality of slave units each provided at a respective load a succession of voltage signals each of positive or negative polarity and of a voltage level either above or below a predetermined threshold;

operating a first one of the loads with the respective slave unit on reception of a signal of either of said polarities;

operating a second one of the loads with the respective slave unit only on reception thereby of a signal of negative polarity;

operating a third one of the loads with the respective slave unit only on reception thereby of a signal of positive polarity; and operating a fourth one of the loads with the respective slave units only on reception thereby of a signal of at least one of said polarities and having a voltage level above said threshold.

10. The method defined in claim 9, further comprising the step of delaying operation of any of the loads on reception of an appropriate signal until same has lasted a predetermined length of time.

11. The method defined in claim 9, further comprising the step of temporarily operating said fourth load with the respective slave unit on reception thereby of a signal having a voltage level below said threshold.

* * * * *